United States Patent

Krompass et al.

[11] Patent Number: 5,934,092
[45] Date of Patent: Aug. 10, 1999

[54] DEVICE FOR COOLING A MOTOR VEHICLE INTERIOR

[75] Inventors: Andreas Krompass, München; Günther Hammerschmid, Baierbrunn; Helmut Mayer, Gilching; Wolfgang Forsthuber, Maisach, all of Germany

[73] Assignee: Webasto Thermosysteme GmbH, Stockdorf, Germany

[21] Appl. No.: 08/962,665

[22] Filed: Nov. 3, 1997

[30] Foreign Application Priority Data

Nov. 2, 1996 [DE] Germany ............ 196 45 178

[51] Int. Cl.⁶ ...................................... B60H 1/32
[52] U.S. Cl. ................................. 62/199; 62/239
[58] Field of Search ............... 62/239, 420, 424, 62/425, 199

[56] References Cited

FOREIGN PATENT DOCUMENTS 37 04 182  8/1988  Germany.

Primary Examiner—William E. Tapolcai
Attorney, Agent, or Firm—Sixbey, Friedman, Leedom & Ferguson; David S. Safran

[57] ABSTRACT

A device for cooling a motor vehicle interior (2) has a first refrigerant loop with a compressor (8), condenser (10), and at least a first evaporator (13). The device furthermore has a second refrigerant loop with at least one more evaporator which is joined to an ice reservoir to form a structural unit (17, 19, 21) and which can be connected in parallel to the first evaporator (13) by at least one valve (15). To enable simple and comfortable static climate control, the structural unit (17, 19, 21) is located as a flat element in at least one wall (4, 3, 5) of the motor vehicle interior and can be brought into a direct heat-transfer connection to the air of the motor vehicle interior.

12 Claims, 3 Drawing Sheets

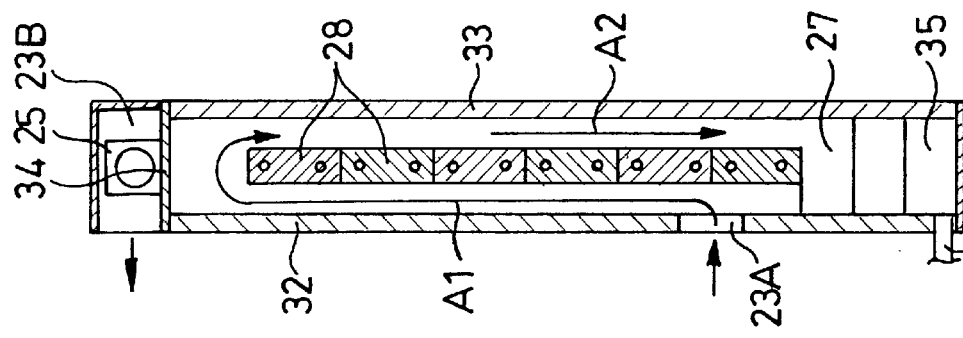
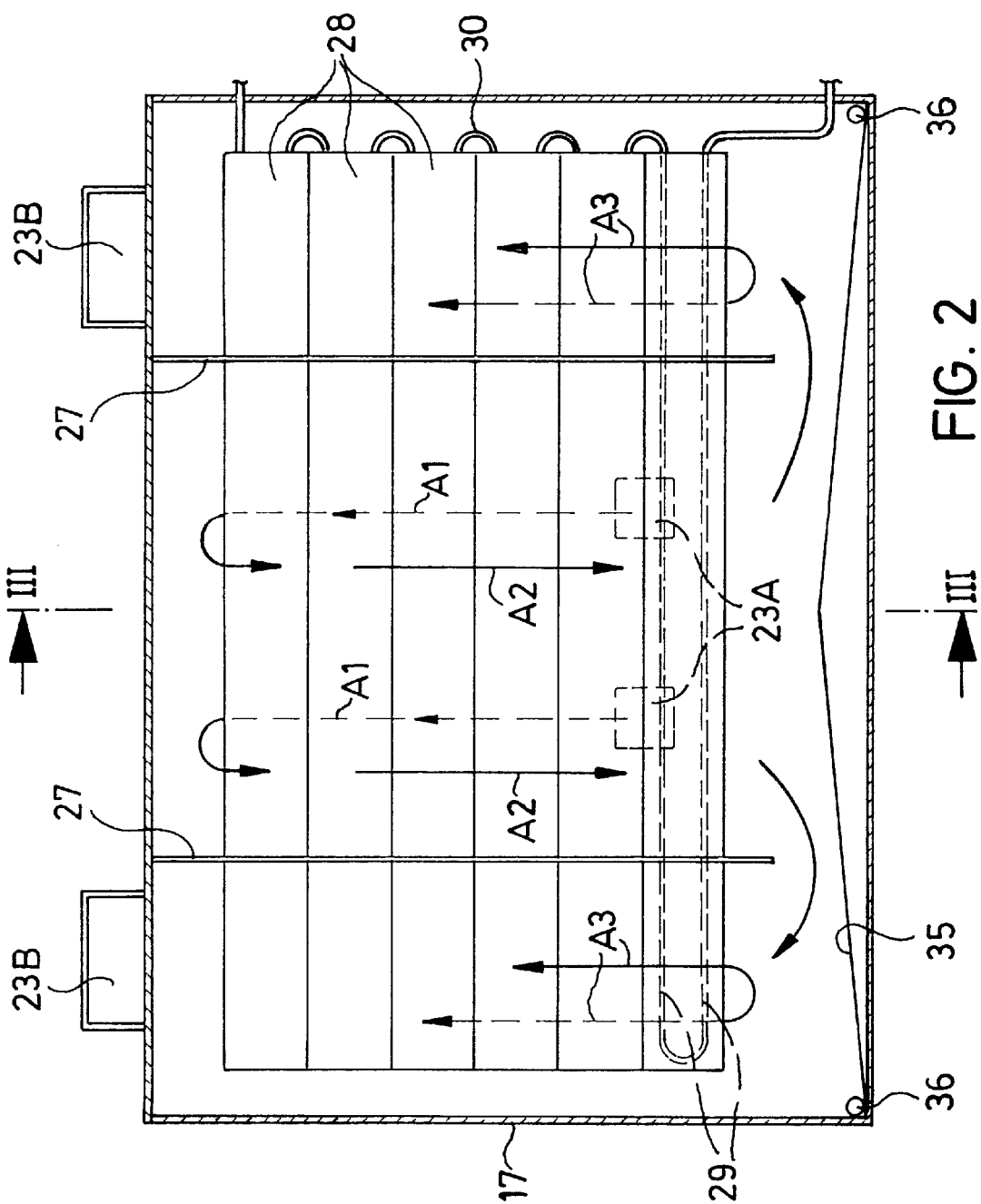

DEVICE FOR COOLING A MOTOR VEHICLE INTERIOR

BACKGROUND OF THE INVENTION

1. Field of the Invention

The invention relates to a device for cooling a motor vehicle interior with a first refrigerant loop which comprises a compressor, condenser and at least one evaporator, and a second refrigerant loop which comprises at least one more evaporator which is joined to an ice reservoir to form a structural unit and which can be connected in parallel to the first evaporator by means of at least one valve.

2. Description of Related Art

A device of the type to which this invention is directed is known from published German Patent Application 37 04 182. The ice reservoir structural unit which includes the second evaporator, while driving, i.e while the compressor is being operated by the motor vehicle drive motor, can be supplied with refrigerant, by which the water in the ice reservoir is converted into ice. When the vehicle is not moving, the refrigerant can be driven via an additional pump in a small loop which includes both the second evaporator and the first evaporator. Here, the second evaporator acts as a condenser when the ice in the ice reservoir melts within the small loop, and the cold energy can be removed as also in driving exclusively on the first evaporator by means of a fan assigned to it. The necessity of another pump causes additional construction cost and pump operation burdens the motor vehicle battery when the vehicle is not moving. In addition, when the refrigerant is liquified and evaporated, additional energy losses occur via the line connections between the second evaporator and the first evaporator when the motor vehicle is standing still.

SUMMARY OF THE INVENTION

The primary object of this invention is to devise a device for cooling of a motor vehicle interior, which delivers cold intermittently to the motor vehicle interior independently of a compressor or pump, and which is simple to build.

This object is achieved in accordance with a preferred embodiment of this invention by the structural unit comprised of an ice reservoir and second heat exchanger being located as a flat element in one wall of the motor vehicle interior and by being able to bring it into a direct heat-transfer connection with the air of the motor vehicle interior.

Direct heat transfer from the ice reservoir to the air ensures extremely low loss energy transfer. Heat transfer can take place by convection in the simplest way, the different temperature and density of the in-flowing and out-flowing air being used.

According to a preferred embodiment of the invention, it is provided that the wall for accommodating the structural unit is a double wall and the resulting housing space is joined via entry and exit openings to the motor vehicle interior. This configuration allows controlled bilateral incident flow to the structural unit within the housing space.

According to another advantageous development, it is provided that the inlet openings and/or exit openings can be selectively closed or at least partially cleared by blocking elements. These blocking elements make it possible to regulate the delivery of cold in the simplest manner by controlling the amount of air flowing through the housing space. These blocking elements can be formed by simple flaps or slide valves or lattices which can be moved against one another in the manner of plates. When the blocking elements are closed no flow takes place through the housing space of the structural unit so that no cold will be delivered to the motor vehicle interior.

For increased transfer of cold to the air of the motor vehicle interior it is furthermore advantageous if forced flow can take place through the housing space by means of a preferably adjustable speed fan.

The device in accordance with the invention can be used to special advantage in a truck, the interior being formed by its cab. In this case, the device for climate control of the cab is used when the vehicle is not moving. In this way, a pleasant climate can be produced in the cab even in hotter countries for the professional driver during prescribed rest or sleep breaks.

The wall in which the ice reservoir structural unit is located can preferably be formed by the back or side wall of the cab. In another embodiment, it is provided that, alternatively or in addition, other ice reservoir structural units are located in the roof of the cab and/or in a horizontal bulkhead which used for dividing the sleeping berth in the cab. Likewise, incorporation of the cab floor as the installation site is conceivable.

For stronger cooling of the air, it is advantageous if there are baffles on the structural unit which force the passing air to pass through the reservoir unit several times. These baffles can, for example, be located essentially parallel to the direction of primary flow of the air, the air flowing first through, for example, a central area separated by the baffles and then through its two outside areas in succession.

For faster and better heat transfer from the refrigerant to the reservoir medium within the ice reservoir structural unit, it is advantageous if the tubes through which the refrigerant moves are provided with surface-enlarging connecting sheets.

These and further objects, features and advantages of the present invention will become apparent from the following description when taken in connection with the accompanying drawings which, for purposes of illustration only, show a single embodiment in accordance with the present invention.

BRIEF DESCRIPTION OF THE DRAWINGS

FIG. 2 is a front view of an ice reservoir structural unit located in a double-walled housing space with baffles;

FIG. 3 shows the structural unit of FIG. 2 in a cross-sectional view; and

DETAILED DESCRIPTION OF THE PREFERRED EMBODIMENT

Figure 1:
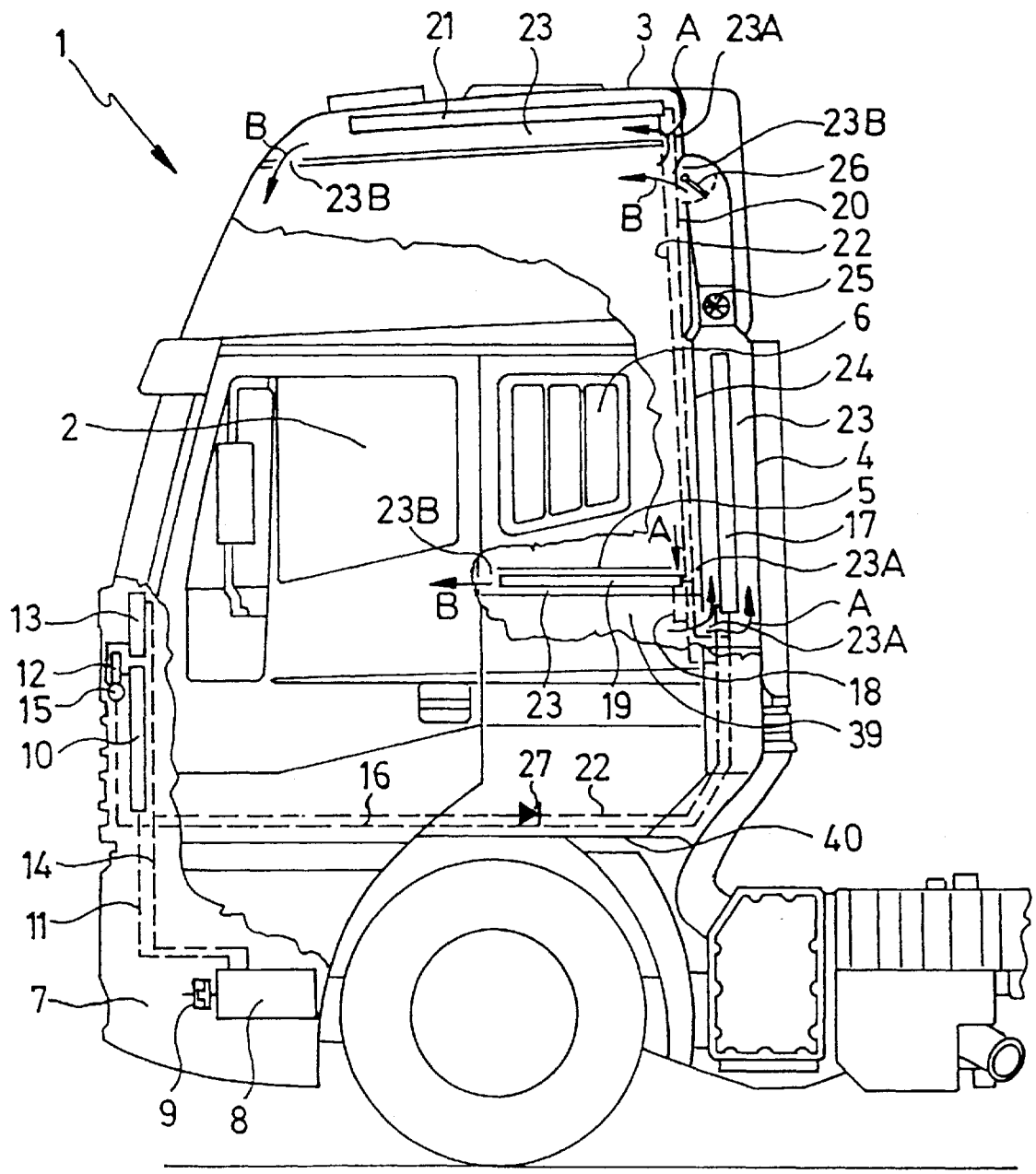
FIG. 1 is a schematic, partially broken-away side elevational view of a truck cab incorporating the cooling device of the present invention.

FIG. 1 shows part of a truck 1 in which a vehicle interior is formed within cab 2. Cab 2 is bounded to the top by roof 3 and to the rear by back wall 4. Within the rear part of the cab there is a horizontal bulkhead 5 which, as is conventional, serves as a surface of a sleeping berth in a long haul truck, in which the rear part of cab 2 is made as a sleeping compartment 6.

In engine compartment 7 of truck 1 is a compressor 8 which can be joined by means of magnetic clutch 9 to the vehicle drive motor (not shown) via V-belts. Compressor 8 is incorporated into a first refrigerant loop, it being joined via a supply line 11 to a condenser 10, collector 12, and a first evaporator 13 with an expansion element. The refrigerant flowing in the first refrigerant loop is returned from first evaporator 13, via return line 14, to compressor 8.

Between the collector 12 and the first evaporator 13 there is a reversing valve 15 from which a branch supply line 16 that belongs to the second refrigerant loop branches. Into this second refrigerant loop, one or more ice reservoir structural units is/are integrated, each of which comprises a second evaporator with an expansion element and an ice reservoir which surrounds it. A first ice reservoir structural unit 17 is located in the area of back wall 4 of truck 1. The refrigerant flowing in via branch supply line 16 can be routed via branch line 18, optionally by means of another reversing valve which is not shown, to a second ice reservoir structural unit 19 and a third ice reservoir structural unit 21. The second ice reservoir structural unit 19 is located in horizontal bulkhead 5 in the area of sleeping compartment 6.

The third ice reservoir structural unit 21 is located in the area of roof 3. Unit 21 is connected to branch supply line 16 of the second refrigerant loop via another branch line 18. The ice reservoir structural units 17, 19 and 21 are connected to a common return line 22 which, for its part, is joined to the return line 14 which returns the refrigerant to compressor 8. Non-return valve 27, located in return line 22, prevents refrigerant gas from flowing back to ice reservoir structural units 17, 19, and 21 and condensing out there.

Ice reservoir structural unit 17 is located in a housing space 23 which is formed between the back wall 4 of the cab 2 and an intermediate wall 24 located a distance in front of it. Likewise, ice reservoir structural unit 21 which, is alternative or optional, is located a housing space 23 in the roof area, and the other optional or alternative ice reservoir structural unit 19 is located in the area of horizontal bulkhead 5 in another housing space 23 which is produced by a double wall construction of bulkhead 5.

Housing spaces 23 are each joined by inlet 23A and outlet 23B to cab 2 so that air flow through double-walled housing space 23 can take place. This through-flow of air, which takes place either by convection based on the temperature-dictated density differences of the air in cab 2, or which necessarily takes place by optional fan 25, can be regulated by a blocking element 26. This blocking element 26 is made, for example, as a pivoting flap as is shown on the upper end of the housing space 23 of the ice reservoir structural unit 17. The flap can be actuated by hand or by a motor and can be replaced by other corresponding blocking elements, such as movable lattices or slide valves.

Even if this is not shown in FIG. 1, it goes without saying that other housing spaces 23 for ice reservoir structural units 19 and 21 can also each be equipped with a corresponding blocking element and/or fan. Air flows through inlet 23, in the direction of arrows A, into housing space 23, is routed past respective ice reservoir structural unit 17, 19, or 21 and is cooled in doing so, after which the air leaves housing spaces 23, as cooled air, in the direction toward cab 2 through exit openings 23B in the direction of arrows B.

The system is preferably designed such that compressor 8 has enough power to provide not only enough cooling power for first evaporator 13 for normal cooling of cab 2 while driving, even with a high demand for cold when the internal combustion engine is operating, but also to load one or more of ice reservoir structural units 17, 19, 21 by converting water into ice so that, during a subsequent pause, by simple flow through the respective housing space 23, the cab 2 can be cooled with air. This ensures that the driver, during his rest or sleeping breaks, is in a pleasant climate in cab 2 even in hotter countries.

Figure 4:
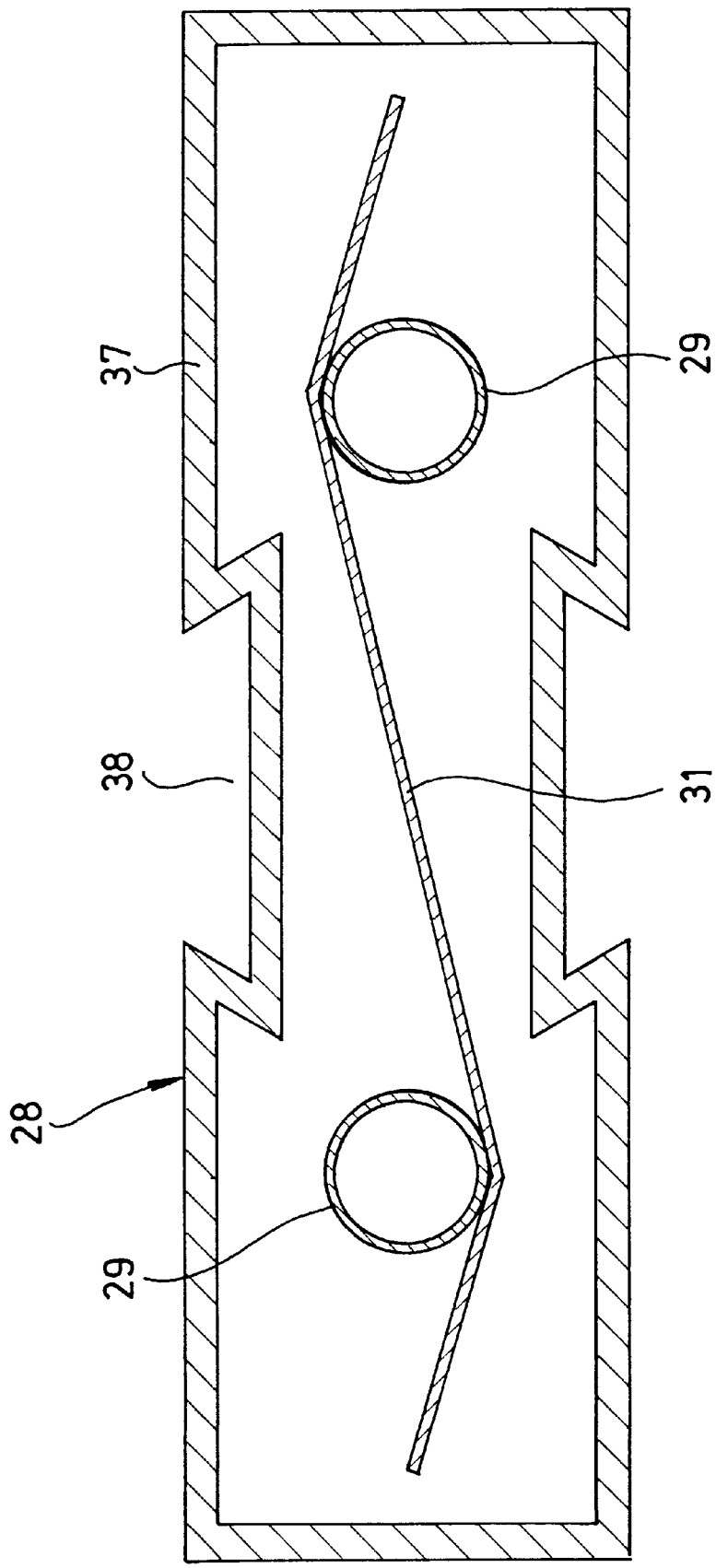
FIG. 4 is a cross-sectional view of an ice reservoir-panel of an ice reservoir structural unit.

As is shown in FIGS. 2 and 3, using the example of ice reservoir structural unit 17, the unit is formed of several ice reservoir elements 28, of which one is shown in cross section in FIG. 4. The ice reservoir elements 28 are joined via dovetail grooves 38 on their outer wall 37 to appropriately shaped holders. As is shown using the example of the lowermost of the six ice reservoir element shown in FIG. 2, a tube 29, through which refrigerant flows, is curved in the shape of a hairpin and run in each ice reservoir element. Individual tubes 29 are joined to one another, on one side, by arc-shaped tube connectors 30. Width-wise, i.e. transversely to the longitudinal axis of the vehicle, ice reservoir structural unit 17 is divided in terms of flow by a total of four vertically arranged baffles 27 for the air to be cooled, such that the air flows past ice reservoir structural unit 17 a total of three times. After entry of the air through underlying inlet openings 23A, it rises to the top as represented by the arrows A1 in the part of housing space 23 which is located between ice reservoir elements 28 and front wall 32 of structural unit 17, the wall being provided with an insulating layer. The middle part of ice reservoir structural unit 17 bounded by baffles 27 is closed to the top by an upper wall 34 so that air is deflected in the upper part, and according to the arrows A2, is routed to the bottom between ice reservoir elements 28 and back wall 33 which is, likewise, provided with an insulating layer. In the front lower region of structural unit 17, the crossings to the outer areas of baffles 27 are open so that the air can rise to the top there to either side of ice reservoir elements 28, as represented by arrows A3, where it ultimately enters cab 2 as cooled air through outlet opening 23B and sinks slowly to the floor as it delivers cold.

As already indicated above, the air circulation in ice reservoir structural units 17, 19, 21 can be controlled by blocking element(s) 26 and can be optimally forced by fan(s) 25. The ice reservoir structural units in the lower part preferably have a condensate tray 35 in which there are fins sloped to the outside in the floor area so that the humidity which condenses by cooling of the air can be discharged into the open via two outside condensate drain lines 36 having the corresponding hoses.

As shown in FIG. 4, in the interior of ice reservoir element 28 there is a connection sheet 31 which is bent into an S-shape, by means of which the two legs of hairpin shape tube 29 are joined, such that good heat conduction takes place in the entire ice reservoir element 28, and thus, uniform ice formation or uniform melting of the ice can take place. For this reason, almost all of the housing of ice reservoir elements 28 which is bounded by outside wall 37 is filled with a water-based storage medium which is converted into the solid state by the refrigerant flowing through tubes 29 and which is converted back into the liquid state by the air passing by outside wall 37 in static climate control.

By means of the inventive device, comfortable climate control of the vehicle interior at rest is possible. Valve 15 for charging of ice reservoir structural units 17, 19, 21 is controlled, preferably automatically, by means of a control unit, depending on the degree of use of the compressor by the vehicle evaporator 13. If magnetic clutch 9 receives a decoupling signal due to high enough cold power on evaporator 13, reversing valve 15 is actuated and compressor 8 continues to run to charge ice reservoir structural unit(s) 17, 19, 21.

As soon as renewed cold demand is signalled on evaporator 13, valve 15 is switched again so that the interior (cab 2) is cooled on a priority basis.

In addition to the described installation sites, bottom wall 40 and side walls 39 of cab 2 are also possible locations for housing the ice reservoir structural units.

The ice reservoir structural units can be discharged in a regulated manner by controlling fan 25 and/or blocking elements 26 depending on the interior temperature measured by means of a sensor.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Device for cooling a motor vehicle interior comprising a first refrigerant loop having a compressor, a condenser and at least one evaporator, and a second refrigerant loop having at least one additional evaporator which is joined to an ice reservoir to form a structural unit and at least one valve for connecting the additional evaporator in parallel to the first evaporator; wherein the structural unit is a flat element which is located within at least one wall bounding a motor vehicle interior space and which has a direct heat-transfer connection to the motor vehicle interior; wherein said wall is a double wall defining a housing space therebetween which is joined via entry and exit openings to the motor vehicle interior space; and wherein at least one of the inlet openings and exit openings is selectively closable and at least partially openable by blocking elements.

2. Device as claimed in claim 1, wherein a fan is provided for forcing a flow of air through the housing space.

3. Device as claimed in claim 1, wherein the vehicle interior space is formed by a cab of a truck.

4. Device as claimed in claim 1, wherein the air passing by the structural unit is provided with baffles for forcing air to repeatedly pass over the ice reservoir units.

5. Device as claimed in claim 1, wherein refrigerant-carrying tubes run in the structural unit and are provided with surface-enlarging connecting sheets.

6. Device as claimed in claim 1, the ice reservoir units contain hairpin shaped refrigerant-carrying tubes, legs of which are connected by surface-enlarging connecting sheets.

7. Device for cooling a motor vehicle interior comprising a first refrigerant loop having a compressor, a condenser and at least one evaporator, and a second refrigerant loop having at least one additional evaporator which is joined to an ice reservoir to form a structural unit and at least one valve for connecting the additional evaporator in parallel to the first evaporator; wherein the structural unit is a flat element which is located within at least one wall bounding a motor vehicle interior space and which has a direct heat-transfer connection to the motor vehicle interior; wherein the vehicle interior space is formed by a cab of a truck; and wherein the at least one wall is formed by at least one of a back wall and a side wall of the cab.

8. Device for cooling a motor vehicle interior comprising a first refrigerant loop having a compressor, a condenser and at least one evaporator, and a second refrigerant loop having at least one additional evaporator which is joined to an ice reservoir to form a structural unit and at least one valve for connecting the additional evaporator in parallel to the first evaporator; wherein the structural unit is a flat element which is located within at least one wall bounding a motor vehicle interior space and which has a direct heat-transfer connection to the motor vehicle interior; wherein the vehicle interior space is formed by a cab of a truck; and wherein the at least one wall is formed by a roof of the cab.

9. Device for cooling a motor vehicle interior comprising a first refrigerant loop having a compressor, a condenser and at least one evaporator, and a second refrigerant loop having at least one additional evaporator which is joined to an ice reservoir to form a structural unit and at least one valve for connecting the additional evaporator in parallel to the first evaporator; wherein the structural unit is a flat element which is located within at least one wall bounding a motor vehicle interior space and which has a direct heat-transfer connection to the motor vehicle interior; wherein the vehicle interior space is formed by a cab of a truck; and wherein the at least one wall is formed by a horizontal bulkhead which is used to form a sleeping berth in the cab.

10. Device for cooling a motor vehicle interior comprising a first refrigerant loop having a compressor, a condenser and at least one evaporator, and a second refrigerant loop having at least one additional evaporator which is joined to an ice reservoir to form a structural unit and at least one valve for connecting the additional evaporator in parallel to the first evaporator; wherein the structural unit is a flat element which is located within at least one wall bounding a motor vehicle interior space and which has a direct heat-transfer connection to the motor vehicle interior; wherein the air passing by the structural unit is provided with baffles for forcing air to repeatedly pass over the ice reservoir units and wherein the baffles are essentially parallel to a primary direction of air flow and divide the structural unit into a central area and two outside areas through which flow takes place at least partially in succession.

11. Device for cooling a motor vehicle interior comprising a first refrigerant loop having a compressor, a condenser and at least one first evaporator, and a second refrigerant loop having at least one additional evaporator which is joined to an ice reservoir to form a structural unit and at least one valve for connecting the at least one additional evaporator in parallel to the at least one first evaporator, the structural unit of the evaporator and ice reservoir being a flat element which is located within at least one wall bounding a motor vehicle interior space and being in direct heat transfer connection to the motor vehicle interior; wherein a control unit for controlling cooling of vehicle interior is connected to said at least one valve, said control unit actuating said at least one valve so as to give priority to connection of the compressor to said at least one first evaporator for cooling of the motor vehicle interior over connecting of the compressor to the additional evaporator for charging of the ice reservoir.

12. Device for cooling a motor vehicle interior according to claim 11, wherein said control unit is responsive to a compressor deactivation signal from said at least one first evaporator for maintaining operation of the compressor and for shifting said at least one valve into a position directing refrigerant flow from said compressor to said at least one additional evaporator instead of to said at least one first evaporator unit; and wherein said control unit is responsive to a compressor activation signal from said at least one first evaporator for shifting said at least one valve back into a position directing refrigerant flow from said compressor to said at least one first evaporator instead of to said at least one additional evaporator unit.

* * * * *